US010200404B2

(12) United States Patent
Cruz Mota et al.

(10) Patent No.: US 10,200,404 B2
(45) Date of Patent: *Feb. 5, 2019

(54) BEHAVIORAL WHITE LABELING

(71) Applicant: Cisco Technology, Inc., San Jose, CA (US)

(72) Inventors: Javier Cruz Mota, Assens (CH); Jean-Philippe Vasseur, Saint Martin D'uriage (FR); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,257

(22) Filed: Jan. 5, 2018

(65) Prior Publication Data

US 2018/0146007 A1 May 24, 2018

Related U.S. Application Data

(63) Continuation of application No. 14/338,582, filed on Jul. 23, 2014, now Pat. No. 9,900,342.

(51) Int. Cl.
*H04L 29/06* (2006.01)

(52) U.S. Cl.
CPC ...... *H04L 63/1458* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 7,234,168 B2 | 6/2007 | Gupta et al. | |
| 7,903,551 B2 | 3/2011 | Ye | |
| 8,418,249 B1 | 4/2013 | Nucci et al. | |
| 8,650,287 B2 | 2/2014 | Mahadik et al. | |
| 8,762,298 B1* | 6/2014 | Ranjan | G06N 5/02 706/12 |
| 8,789,176 B1 | 7/2014 | Brandwine | |
| 8,813,236 B1 | 8/2014 | Saha et al. | |
| 2002/0069278 A1* | 6/2002 | Forslow | H04L 63/0227 709/225 |
| 2003/0004688 A1* | 1/2003 | Gupta | G06F 21/55 702/188 |
| 2007/0153689 A1* | 7/2007 | Strub | H04L 63/1441 370/230 |
| 2007/0209068 A1* | 9/2007 | Ansari | H04L 45/00 726/13 |

(Continued)

*Primary Examiner* — Trang T Doan
(74) *Attorney, Agent, or Firm* — Parker Ibrahim & Berg LLP; James M. Behmke; Stephen D. LeBarron (57) ABSTRACT

In one embodiment, a traffic model manager node receives data flows in a network and determines a degree to which the received data flows conform to one or more traffic models classifying particular types of data flows as non-malicious. If the degree to which the received data flows conform to the one or more traffic models is sufficient, the traffic model manager node characterizes the received data flows as non-malicious. Otherwise, the traffic model manager node provides the received data flows to a denial of service (DoS) attack detector in the network to allow the received data flows to be scanned for potential attacks.

25 Claims, 9 Drawing Sheets

(56) References Cited

U.S. PATENT DOCUMENTS

| | | | |
|---|---|---|---|
| 2008/0163356 A1* | 7/2008 | Won-Jip | H04L 63/1441 726/13 |
| 2008/0201278 A1* | 8/2008 | Muller | G06K 9/6284 706/12 |
| 2008/0263661 A1* | 10/2008 | Bouzida | H04L 63/1416 726/22 |
| 2009/0138968 A1 | 5/2009 | Setter | |
| 2010/0064368 A1 | 3/2010 | Stolfo et al. | |
| 2010/0284283 A1 | 11/2010 | Golic et al. | |
| 2011/0023120 A1 | 1/2011 | Dai et al. | |
| 2011/0153811 A1 | 6/2011 | Jeong et al. | |
| 2012/0036579 A1* | 2/2012 | Lee | H04L 63/1425 726/25 |
| 2012/0054866 A1 | 3/2012 | Evans et al. | |
| 2012/0278890 A1 | 11/2012 | Maatta et al. | |
| 2013/0055367 A1 | 2/2013 | Kshirsagar et al. | |
| 2014/0033307 A1 | 1/2014 | Schmidtler | |
| 2014/0059216 A1* | 2/2014 | Jerrim | H04L 67/104 709/224 |
| 2014/0181972 A1* | 6/2014 | Karta | H04L 63/1416 726/23 |
| 2014/0201838 A1* | 7/2014 | Varsanyi | G06F 21/552 726/23 |
| 2014/0317735 A1* | 10/2014 | Kolbitsch | H04L 63/145 726/23 |
| 2015/0047032 A1* | 2/2015 | Hannis | H04L 63/1416 726/23 |
| 2015/0128263 A1* | 5/2015 | Raugas | H04L 63/1408 726/23 |
| 2015/0161386 A1* | 6/2015 | Gupta | G06F 11/3612 726/23 |

* cited by examiner

BEHAVIORAL WHITE LABELING

RELATED APPLICATION

The present application is a Continuation Application of U.S. patent application Ser. No. 14/338,582, filed Jul. 23, 2014, entitled BEHAVIORAL WHITE LABELING, by Javier Cruz Mota et al., the contents of which is hereby incorporated by reference

TECHNICAL FIELD

The present disclosure relates generally to computer networks, and, more particularly, to behavioral white labeling for denial of service attacks.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a traffic model manager node receives data flows in a network and determines a degree to which the received data flows conform to one or more traffic models classifying particular types of data flows as non-malicious. If the degree to which the received data flows conform to the one or more traffic models is sufficient, the traffic model manager node characterizes the received data flows as non-malicious. Otherwise, the traffic model manager node provides the received data flows to a denial of service (DoS) attack detector in the network to allow the received data flows to be scanned for potential attacks.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
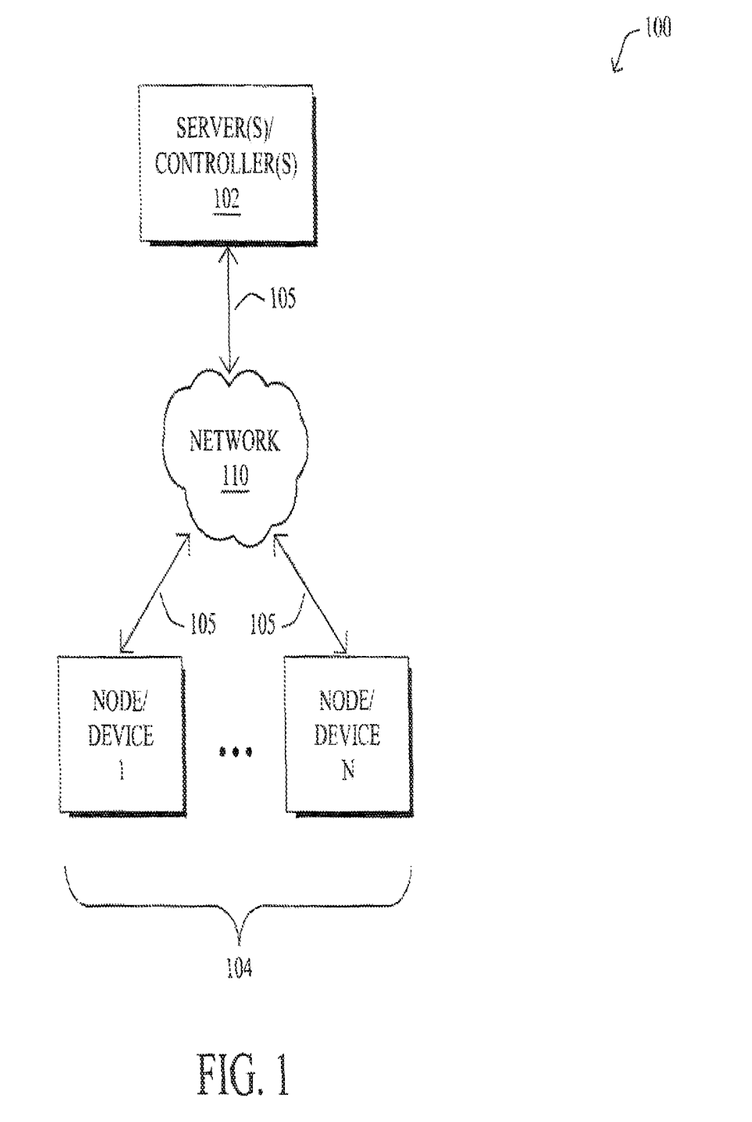
FIG. 1 illustrates an example communication network.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in the network.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
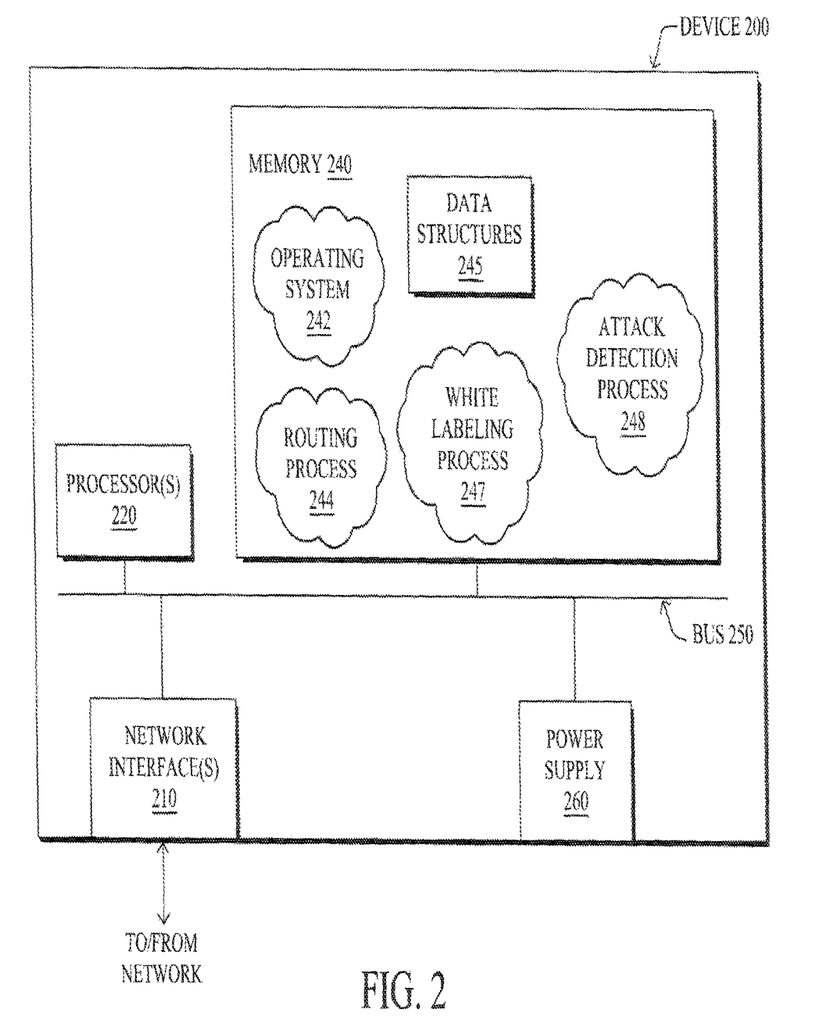
FIG. 2 illustrates an example network device/node.

FIG. 2 is a schematic block diagram of an example node/device 200 (e.g., a server/controller 102, a node/device 104, etc.) that may be used with one or more embodiments described herein, e.g., as any of the devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a white labeling process 247, and/or an attack detection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments, attack detection process 248 may use machine learning to determine whether an attack and/or a specific type of attack is detected. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. In some implementations, attack detection process 248 may also be configured to use additional categories (e.g., classification labels), such as labels indicative of specific types of attacks.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

White labeling process 247, as described in greater detail below, includes computer executable instructions executed by the processor 220 to perform functions that include determining a degree to which data flows in a computer network, such as network 110, conform to one or more traffic models that characterize particular types of data flows as non-malicious, or in other words, the flows are "white-labeled." The white labeling process 247 may operate in conjunction with the attack detection process 248.

Figure 3A:
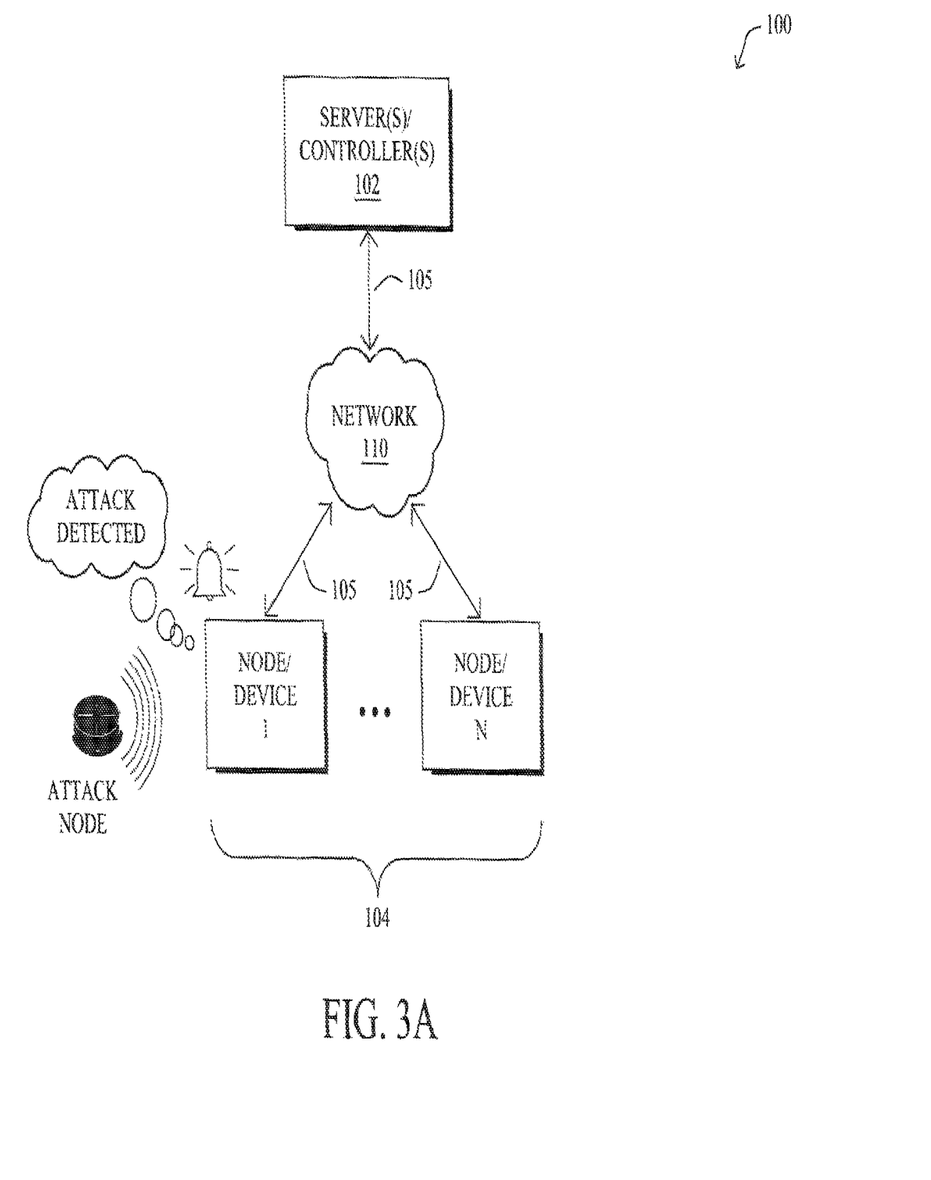
FIGS. 3A-3B illustrate an example of a network attack being detected.
Figure 3B:
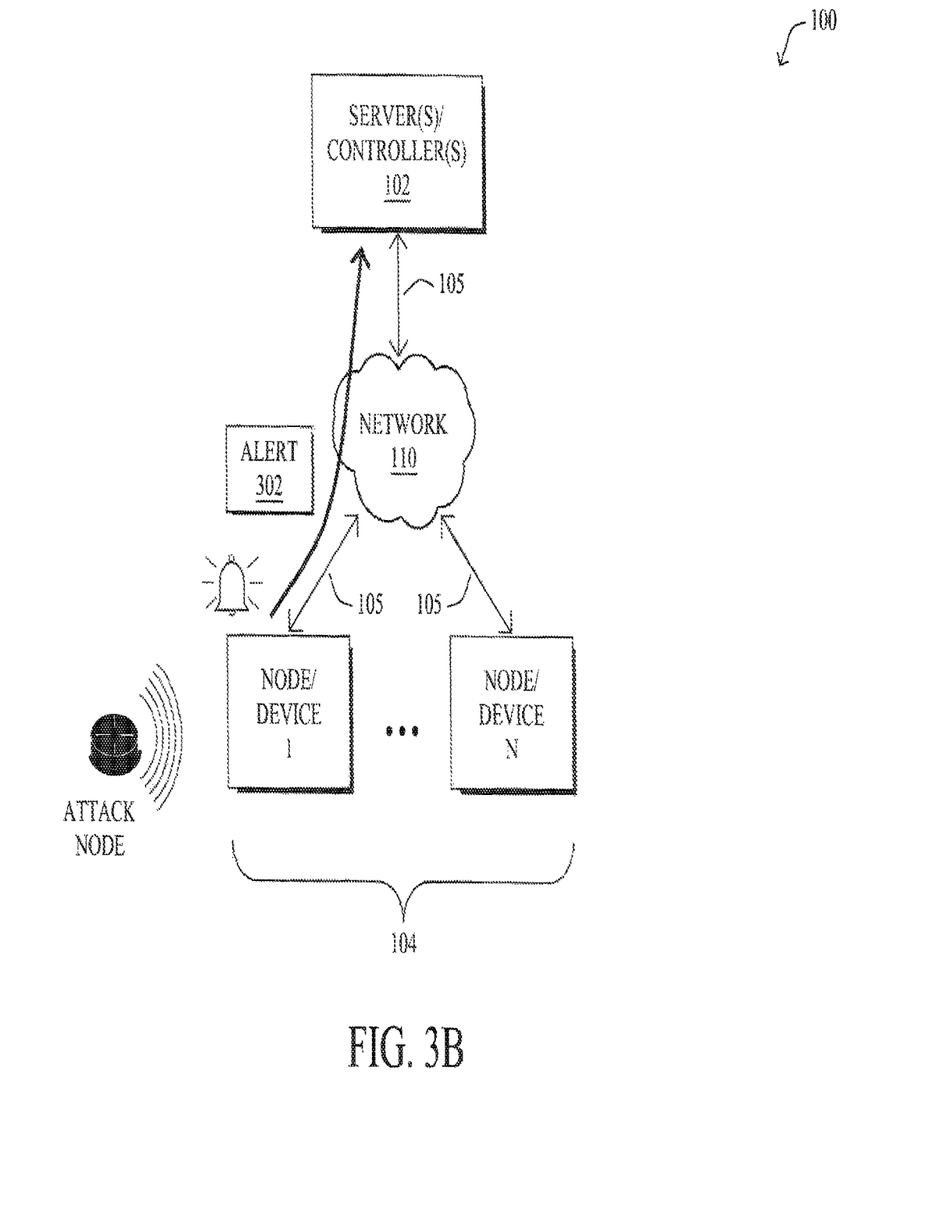

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As referenced above, denial of service is a broad term for any kind of attack aiming, by any means, at making a particular service unavailable (be it a certain application running on a server or network connectivity itself). This is usually performed by bringing the target's resources to exhaustion (target resources may range from bandwidth to memory and CPU). In greater detail, a denial-of-service attack may consist of flooding a target network with hundreds of megabits of traffic (e.g., a volume-based DoS), exhausting a server state by opening a number of TCP connections (e.g., SYN flooding), or by making an HTTP server unavailable by sending it an overwhelming number of requests. An attack may be subtle and exploit well-known vulnerabilities in the target system (e.g., a large number of fragmented IP packets may exhaust the resources of a router), thus leading to attacks that are difficult to detect and mitigate.

Nowadays, denials of service attacks are mostly distributed (DDoS), meaning they are carried out by multiple sources at the same time, making it more difficult to track. In many cases botnets (i.e., armies or infected hosts spread across the network and under the control of a single master) are used for mounting DoS attacks. In addition, source addresses used for attacks can be spoofed, so that blocking an offending address is potentially useless.

DoS attacks can be easy to detect when they are brute-force (e.g., volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. As a result, machine learning techniques are particularly beneficial for learning the behavior of these attacks for detecting them before a server or an entire network becomes unavailable.

As further noted above, a common drawback of DoS/DDoS attack detection and mitigation systems is that they can generate false positives (e.g., legitimate traffic labeled as attack traffic). When using machine learning techniques, in particular, false positives are common when the system observes traffic with characteristics that were not observed during training. This is the case, for instance, when a new internal application is deployed in an Enterprise network. False positives are always highly undesirable, especially in presence of mitigation systems.

One way of solving this is by re-training the machine learning classifiers with data that includes the traffic generated by this new application, but this approach can lead to over-fitting if the new application is very specific to a particular location in the network, for instance. Further, this approach is not scalable in an environment where new applications are deployed at a fast pace.

Behavioral White Labeling for DoS Attacks

The techniques herein allow for white-labeling traffic flows based on traffic behavior, for assuring that these flows are not perturbed by mitigation actions raised by a (D)DoS detector in a network. The disclosed system is able to generate a model of behavior of certain traffic in the network (such as the traffic generated by a newly deployed application in the network) and use this model for deciding whether this traffic must be evaluated by the (D)DoS detector or not. The techniques herein further describe a mechanism for capturing flows of interest and computing their traffic model, deploying models in the network, and applying these models for computing a likelihood score of traffic in the network according to these models. Traffic flows having a high probability (e.g., high likelihood) of being generated by one of the computed models are white-labeled and therefore not tested by the (D)DoS detectors. This avoids potential perturbations caused to critical legitimate traffic by the (D)DoS detector.

Specifically, according to one or more embodiments of the disclosure as described in detail below, a traffic model manager node receives data flows in a network and determines a degree to which the received data flows conform to one or more traffic models classifying particular types of data flows as non-malicious. If the degree to which the received data flows conform to the one or more traffic models is sufficient, the traffic model manager node characterizes the received data flows as non-malicious. Otherwise, the traffic model manager node forwards the received data flows to a denial of service (DoS) attack detector in the network to allow the received data flows to be scanned for potential attacks.

Illustratively, the techniques described herein may be performed by hardware, software, and/or firmware, such as in accordance with the processes 244, 247 and 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, the techniques herein provide for using Machine Learning (ML) techniques that are able to model the traffic that is known to be legitimate, and then "white-listing" (also called "white labeling") traffic that corresponds to this computed model. Then, any white-listed traffic is taken off of the chain of attack detection, classification and mitigation, thus avoiding false positives and consequently assuring correct communication for internal Enterprise applications, for example.

Figure 4:
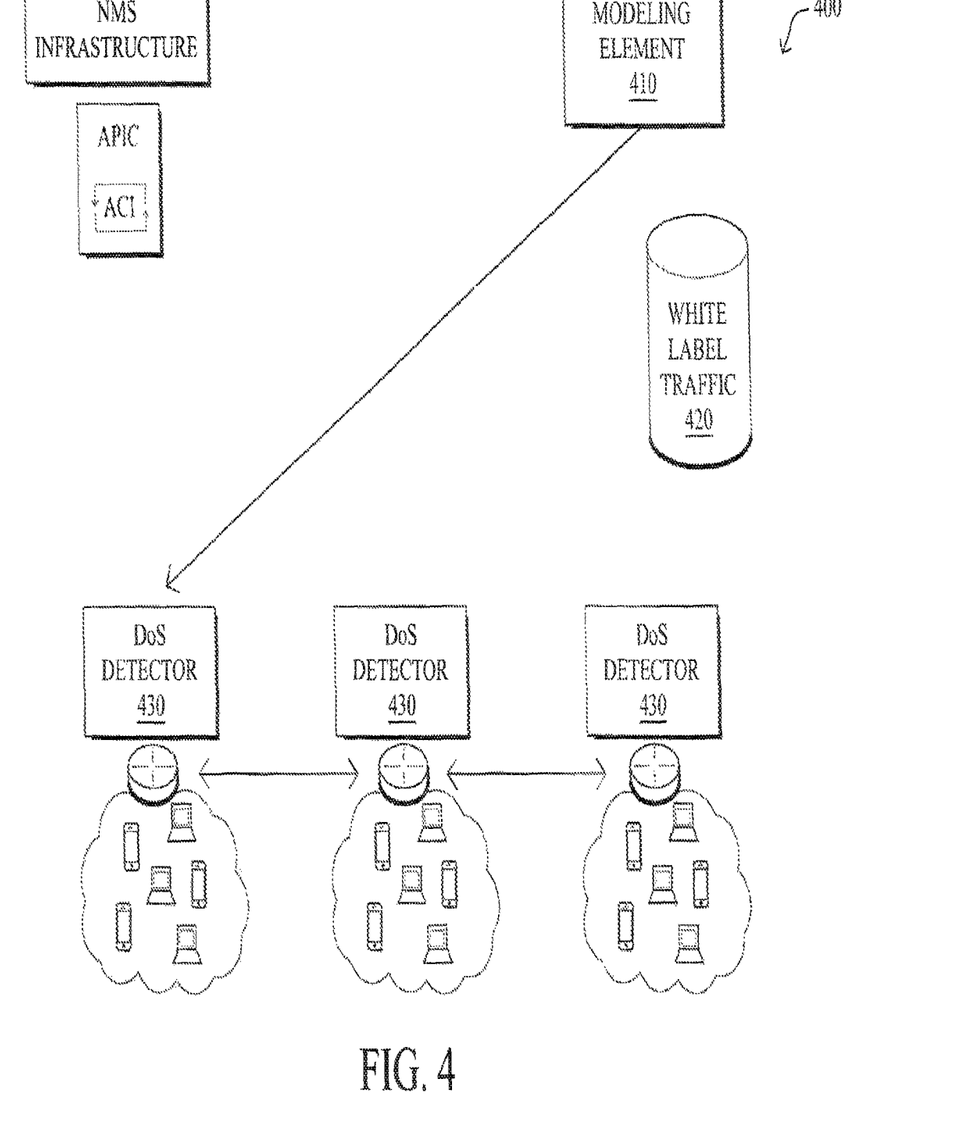
FIG. 4 illustrates an example diagrammatic representation of the network architecture according to embodiments of the present disclosure.

Referring to FIG. 4, a first component of this disclosure involves the Modeling Element (ME) 410, which may be hosted on a device such as the device 200, as shown in FIG. 2, for example. The ME 410 is in charge of modeling the flows of traffic that the user requests to be white-labeled in order to assure that they are never removed by a (D)DoS mitigation mechanism (the terms "white-list" and "white-label" may be used interchangeably herein). The role of the ME 410 is to compute a model for a traffic that the user wants to white-label. For example, if the traffic model is a Principal Component Analysis (PCA) model, the description of the model may consist of the set of principal vectors, the set of principal values, and the mean value. Or, if a Hidden Markov Model (HMM) is used, the description will consist, for instance, of the description of the states and the transition probabilities between states. Other models, such as a Multi-Gaussian, can also be used.

The Modeling Element 410 takes as an input a data set representative of the traffic to be white-labeled. In particular, traffic flows can be characterized by a set of attributes A (e.g., source/destination address of a device, source/destination port (UDP/TCP), URI, payload fields, values of the IPv6 flow label, etc.), which in turn are used for generating a traffic model TM_i (Traffic Model 'i'). Multiple modes of operation for the Modeling Element 410 are possible.

In one embodiment, the ME 410 operates using a centralized mode of operation. In such a case, the end-user makes use of traces for a set of flows corresponding to a traffic type that must be white-labeled, and provides such traces to the ME that in turn computes the model, as shown in FIG. 4. The ME 410 is located on a server controlled by the end-user. In the centralized mode, the ME generates a set of tuple <Ai, TMi> for each traffic type i to be white-labeled. Alternatively, high granularity information associated to flows to be white-listed (e.g. feature vectors including flow-level features) can be provided (this can be the case, for example, when privacy constraints forbid exporting entire traffic traces).

Figure 5:
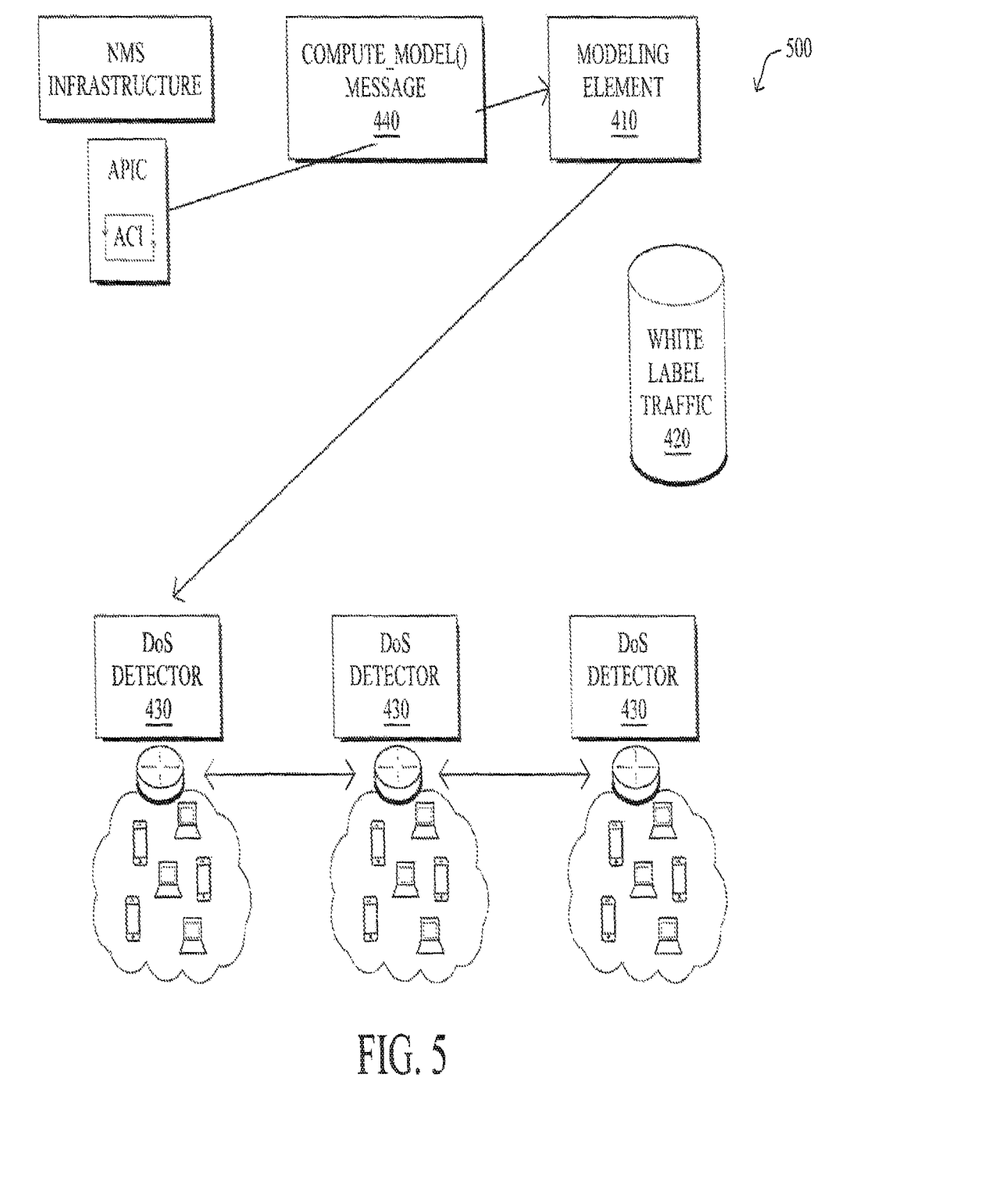
FIGS. 5 and 6 illustrate example diagrammatic representations of training one or more traffic models.

Referring to FIG. 5, the request to compute a traffic model TMi for attribute set Ai may be sent by a NMS or a Network Controller (NC) using the Compute_Model( ) message 440. The Compute_Model( ) message 440 can indicate the following information (e.g., as TLV fields in the message):
  TM_i (Traffic Model "i"): an ID for identifying the model that will be computed;
  The traffic attribute(s) Ai; and/or
  The type of traffic model to be used (optional). If not specified, the ME 410 can choose any of the models in its library. Several methods can be used for modeling the data received by the ME 410. For instance, an iterative PCA algorithm can be used, as referenced above. However, this disclosure is not limited to the use of a specific modeling algorithm.

Figure 6:
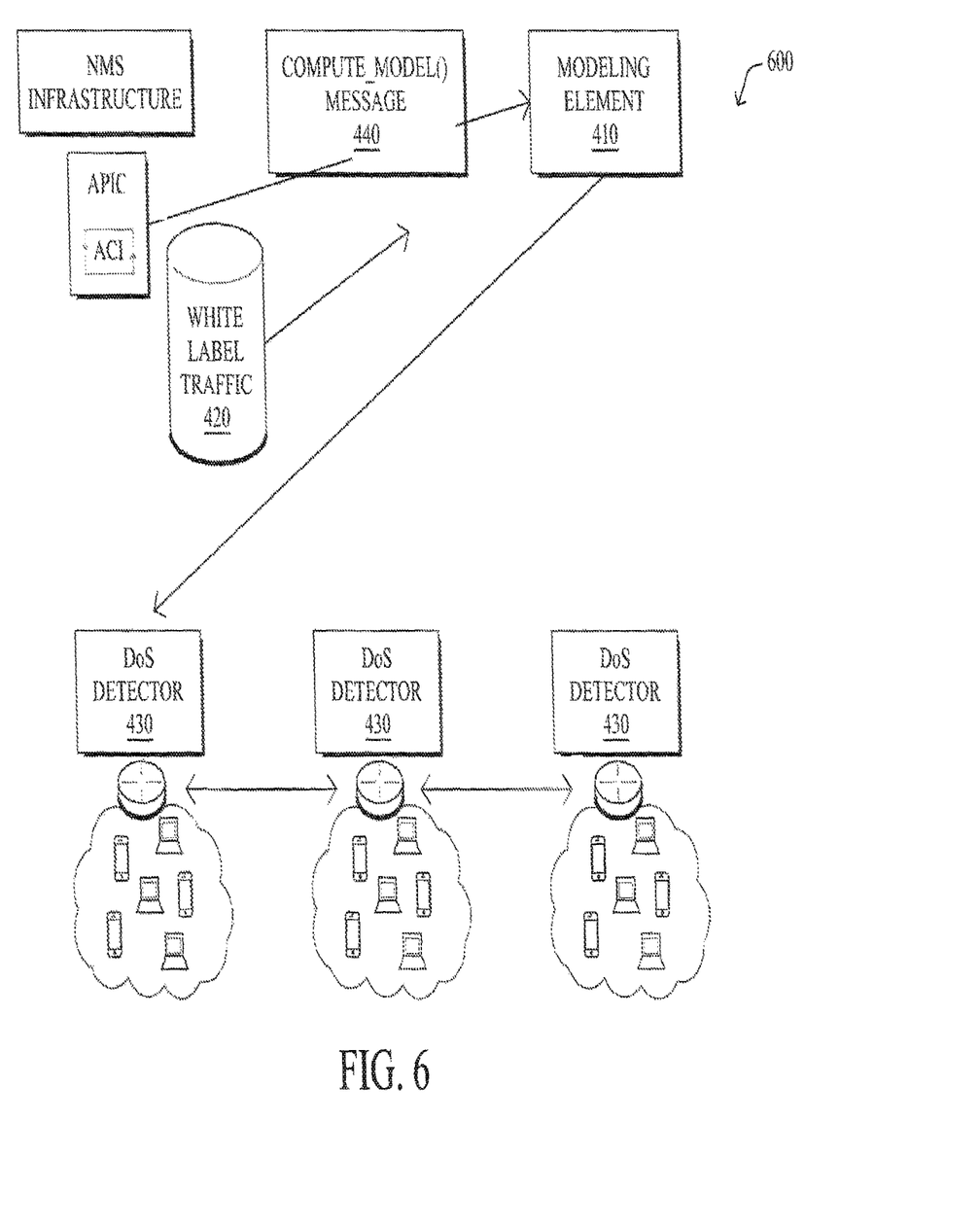

Referring to FIG. 6, in another embodiment, the traffic to be white-labeled may be provided to the ME 410 either by the NMS or the Network Controller (as shown in FIG. 6), or extracted from an edge device, in which case the Compute_Model( ) message 440 can be augmented with traffic traces corresponding to the traffic to be white-labeled. In yet another embodiment, the ME 410 is hosted on the edge device; although it may be preferable for the ME to operate in the centralized mode of operation, as described above.

In yet another embodiment, the white-labeling mechanism can be coupled with a mechanism for detecting traffic behaviors the LM attack detector has not been trained for and extracting the associated features. Thus, whenever a new application is deployed, such a mechanism will detect it as traffic showing unexpected behavior and segregate the associated flows. Such data can then be exported to the ME 410, which can use them in order to compute a traffic model.

Upon reception of the Compute_Model( ) message 440, the ME 410 can start inspecting the available data set(s) and computes a model for the said traffic. When the model computation is finished, the results are pushed from the ME 410 to the White List Managers 460 (described below) for installing the model as a model of granted traffic, i.e., white-labeled traffic. This may be achieved by sending an IPv4 or IPv6 (unicast or multicast) message, i.e., Install_Model( ) 450 (shown in FIG. 7), indicating the following information (e.g., as TLV fields in the message):
  Traffic model TM_i, the ID of the model that is sent;
  The type and description of the traffic model TM_i; and/or
  A life-time for the model (optional). If this value is not specified, the model can be used by the White-List Manager 460 until it receives an uninstall request, or until a new model with the same TM_i ID is sent to the White-List Manager 460.

This Install_Model( ) message 450 can sent by the ME 410 to any element in the network that will perform the white-labeling of granted traffic.

Figure 7:
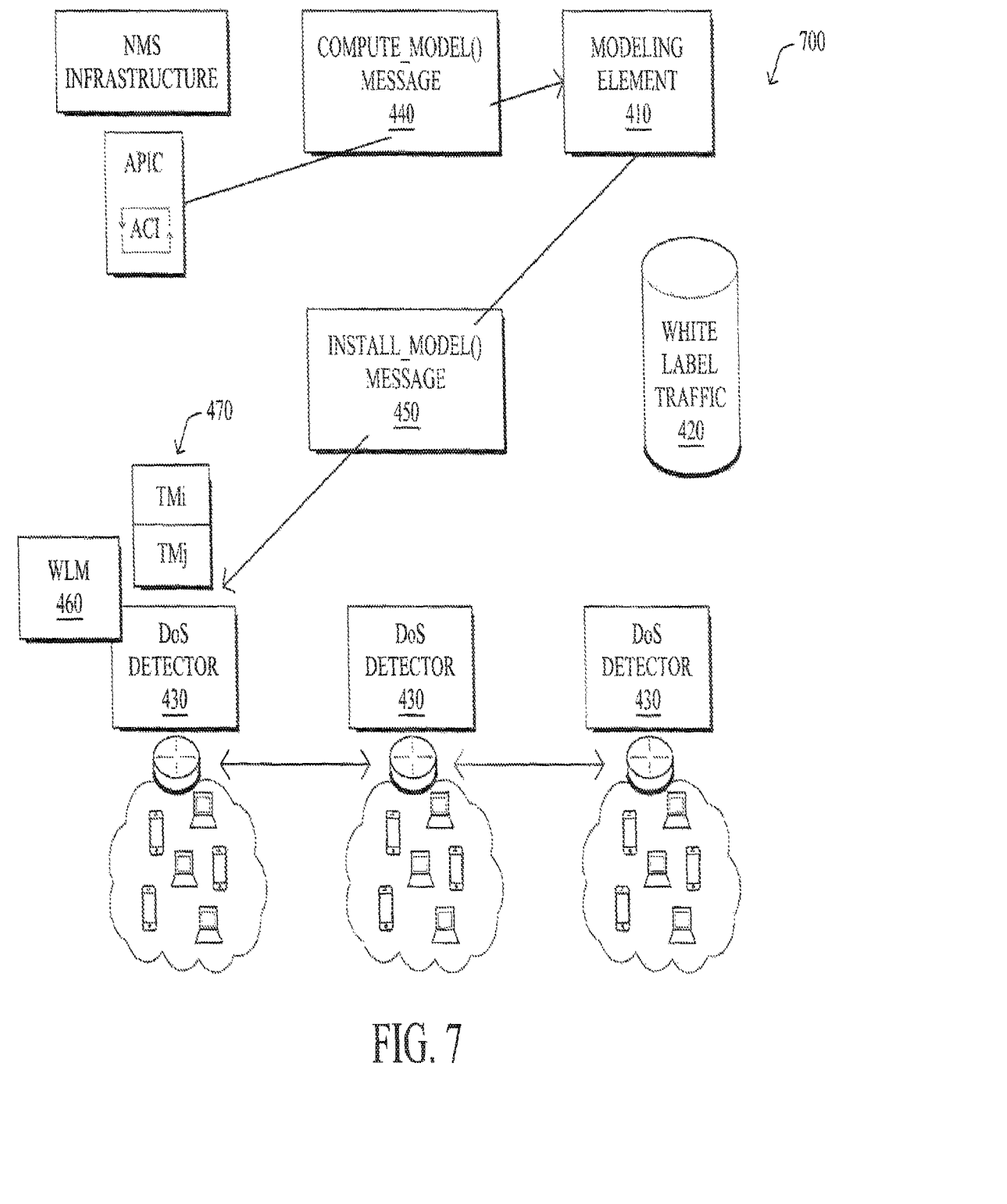
FIG. 7 illustrates an example diagrammatic representation of traffic model installation.

Referring to FIG. 7, another component of this disclosure is the White-List Manager (WLM) 460. An instance of the WLM 460 can be run on every element of the network that performs DoS detection and that is supposed to observe traffic that must be granted. The objective of this element is to manage the list of Traffic Models 470 (e.g., $TM_i$, $TM_j$, etc.) and evaluate the likelihood of traffic flows according to these models. Note that for the purposes of the present disclosure, the "likelihood" specifies a degree of conformity between a given model and the observed traffic. This can be computed, for example, as an actual mathematical likelihood with respect to a statistical model or a distance from a cluster center. The operations that the WLM 460 can perform include, for example, an Install/Uninstall of TMs 470 and a likelihood computation according to the installed traffic models. (Note that the traffic model may be installed or uninstalled for a specific period of time.)

The installation of a traffic model is performed upon receiving the Install_Model( ) message 450, as shown in FIG. 7. In contrast, the uninstallation of a traffic model is done i) after the lifetime of the model is exhausted, ii) after receiving an Install_Model( ) message with the same TM_i (the model would be overwritten with a new model), or upon receiving an Uninstall_Model( ) message, which is an IPv4 or IPv6 message indicating the following information (e.g., as TLV fields in the message):
  Traffic model TM_i, the ID of the model that wants to be removed; and/or
  A delay (optional) for waiting before removal of the model. If this field is not specified, the model may be removed immediately.

The "likelihood" computation of data flows, which is a score of how likely the data flow can be generated by a particular traffic model, or how closely the data flow conforms to the traffic model, depends on the type of traffic model that is used. Indeed, the likelihood of an observation x given a model TM_i is defined as the probability of x given TM_i, i.e., p(x|TM_i), which is the probability that x has been generated by the model TM_i. As referenced above, though, various methods for computing the likelihood may be implemented, such as, for example, the distance from x to the centroid of a cluster, can be used by the WLM 460. In another embodiment, the likelihood computation for each installed traffic model TM 470 is applied to any single traffic flow passing through the WLM 460 (Exhaustive Mode). In yet another embodiment, once a certain pair (e.g., source and destination, IP and port, an application identifier, and the like) has been white-labeled, any future connection between this pair may automatically be considered as granted and the model evaluation is not required (e.g., "Pre-Granted Mode"). In yet another embodiment, once a certain pair (e.g., source and destination) has been white-labeled, during a certain period of time the connections between this pair are automatically considered as granted (e.g., "Temporal Pre-Granted Mode").

Another component of this disclosure is the white-labeling process (e.g., operating on a traffic model manager node), which receives the likelihood evaluation performed by the WLM 460 for a given traffic flow and decides whether to provide the flow to the DoS evaluation module based on the evaluation. In one embodiment, a threshold value for the scores computed by the WLM 460 is applied for deciding whether this flow is granted or not. Then, if the threshold value indicates that a given flow corresponds to one of the white-labeled types of traffic, the flow is not provided to the DoS evaluation module. In another embodiment, a ML classifier can be trained for deciding whether this flow is granted or not, given the flow characteristics and the likelihood scores computed by the WLM 460. In another embodiment, a reputation-based mechanism can be used. In particular, historical data relating to past granted addresses can be leveraged for making the decision. For example, a server for which white-labelling has been granted several times already is likely to receive flows associated to the white-listed application. Notably, when certain flows are not evaluated by the WLM 460 because they are already considered to be granted (e.g., Pre-Granted and Temporal Pre-Granted modes), the WLM 460 will indicate this situation to the WL, and therefore the WLM 460 will not perform any evaluation and will not provide the corresponding flow to the DoS evaluation module.

In another component of this disclosure, indications are provided to the NMS upon detecting the presence of white-labeled traffic on the device (which has not been provided to the DoS detector, according to the mechanism described above), using a message (e.g., WL_report( ) message). The aim of such a message is to report to the user (according to configurable and even dynamic frequency) that 1) the model is operational, but also 2) white-labeling is functioning as expected, which allows the user to verify that the white label model correctly models the target traffic. Optionally, the WL_report( ) message can include samples of traffic that has been identified as white-labeled traffic by the end device. This can enable the end user to further verify that the white-labeling system is indeed effective.

Figure 8:
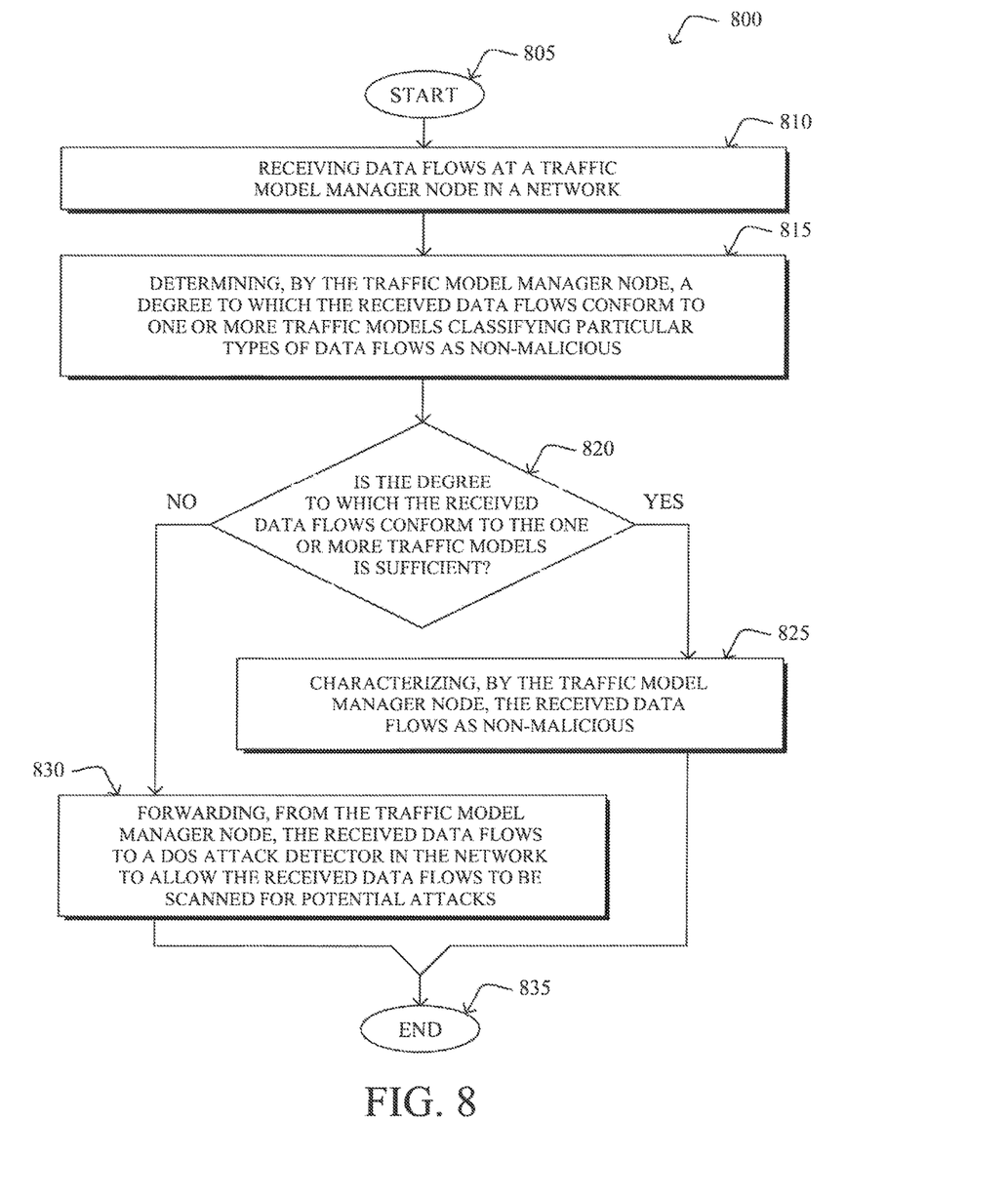
FIG. 8 illustrates an example simplified procedure for behavioral white labeling in a DoS attack architecture.

FIG. 8 illustrates an example simplified procedure for behavioral white labeling in a DoS attack architecture in accordance with one or more embodiments described herein. The procedure 800 may start at step 805, and continues to step 810, where, as described in greater detail above, if the degree to which the received data flows conform to one or more traffic models is sufficient, the traffic model manager node (e.g., any of controllers/servers 102 or nodes/devices 104 shown in FIG. 1) can simply characterize the received data flows as non-malicious, without having to provide the data flows to a DoS attack detector to be scanned for potential attacks.

At step 810, data flows are received at a traffic model manager node in the network. For the purposes of the present disclosure, the WLM 460 represents the traffic model manager node; however, the ME 410 may also represent the traffic model manager node depending on the configuration of network elements, as illustrated in FIGS. 4-7.

At step 815, the traffic model manager node determines a degree to which the received data flows conform to one or more traffic models classifying particular types of data flows as non-malicious. The likelihood calculations relate to this determination, as the greater the degree of conformity that is determined, the higher the likelihood that the received data flows are non-malicious. The one or more traffic models (e.g., TM 470) may be installed by the WLM 460 in accordance with the Install_Model( ) message 450. Further, the one or more traffic models can characterize certain types of data flows as non-malicious based on prior training of the traffic models.

At step 820, the degree to which the received data flows conform to the one or more traffic models is sufficient is determined. As explained above, a greater amount of conformity between the one or more traffic models and the data flows indicates that the data flows are friendly (e.g., non-malicious). The degree to which the received data flows conform to the one or more traffic models is sufficient when the degree exceeds a predetermined threshold amount, for example.

If the amount of conformity between the data flows and the traffic models is deemed to be sufficient, the data flows may simply be characterized as non-malicious (step 825). In other words, the data flows correspond to "white-labeled" traffic. Thus, there is no need to send the non-malicious data flows to the DoS attack detector and risk receiving a false positive and consume potentially limited resources. When the data flow is characterized as non-malicious, an indication may be sent to the NMS so as to inform the end user of the white-labeling activity.

In contrast, if the amount of conformity between the data flows and the traffic models is not deemed to be sufficient, those data flows do not correspond to "white-labeled" traffic, and the data flows are provided to a DoS attack detector in the network to allow the received data flows to be scanned for potential attacks (step 830). Therefore, as a result of the above techniques, network traffic, which should be evaluated for potential DoS attacks, will only be sent to the DoS attack detector if it is not already known that the traffic is safe. That is, if the traffic can be identified as corresponding to "white-labeled" traffic, based on one or more traffic models computed using machine learning techniques, there is no need to further examine that traffic for DoS attacks by sending the traffic to the DoS attack detector.

The techniques described herein, therefore, allow a new application to be introduced into the network without having to retrain any deployed DoS attack detectors. Instead, as explained above, the retraining is not necessary, since the white-labeled flows are not seen by the DoS detector, so there is no need to include them in the training sets. Further, a standard white-labeling technique based on addresses, ports, applications, and the like could be exploited by an attacker attempting to bypass the DDoS detection performed by the network. However, the disclosed embodiments avoid this, since the white-labeling is based on a precise model of the behavior of the traffic of interest, not just elements of the communication that can be spoofed by an attacker, such as an IP address.

While there have been shown and described illustrative embodiments that provide for behavioral white labeling in a DDoS attack architecture, it is to be understood that various other adaptations and modifications may be made within the spirit and scope of the embodiments herein. For example, while the techniques herein are described primarily with respect to DoS attacks, the techniques herein may also be adapted for use with other types of network attacks. In addition, while certain networks and topologies are described herein, the techniques may be applied more generally to any form of computer network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving a data flow at a traffic model manager node in a network;
   determining, by the traffic model manager node, a degree to which the received data flow conforms to one or more traffic models classifying particular types of data flows as non-malicious;
   when the degree to which the received data flow conforms to the one or more traffic models is above a threshold, characterizing, by the traffic model manager node, the received data flow as non-malicious, and
   white labeling the received data flow that is characterized as non-malicious, wherein white labeled data flows cause the received data flow characterized as non-malicious to bypass a Denial of Service (DoS) attack detector and wherein the white labeled data flows are not scanned by the DoS attack detector, wherein the DoS attack detector is a device in the network; and
   when the degree to which the received data flow conforms to the one or more traffic models is below the threshold, forwarding, from the traffic model manager node, the received data flow to the DoS attack detector in the network, wherein the DoS attack detector scans the received data flow for potential attacks.

2. The method as in claim 1, wherein the degree to which the received data flow conforms to the one or more traffic models is sufficient when the degree exceeds a predetermined threshold amount.

3. The method as in claim 1, wherein the degree to which the received data flow conforms to the one or more traffic models is sufficient when a source of the received data flow corresponds to a source from which previous data flows have been characterized as non-malicious.

4. The method as in claim 1, wherein whether the degree to which the received data flow conforms to the one or more traffic models is sufficient is dependent on a determination made by a machine learning classifier.

5. The method as in claim 1, further comprising:
   when a particular data flow is characterized as non-malicious based on the one or more traffic models, characterizing, by the traffic model manager node, all future occurrences of the particular data flow as non-malicious.

6. The method as in claim 1, further comprising:
   when a particular data flow is characterized as non-malicious based on the one or more traffic models, characterizing, by the traffic model manager node, future occurrences of the particular data flow as non-malicious for a predetermined period of time.

7. The method as in claim 1, further comprising:
   receiving, at the traffic model manager node, an indication from a machine learning traffic modeler to install the one or more traffic models.

8. The method as in claim 1, further comprising:
   when characterizing the received data flow as non-malicious, sending, from the traffic model manager node, a message to a centralized management node indicating that the received data flow has been characterized as non-malicious.

9. The method as in claim 8, wherein the message further indicates other sample data flows that have been characterized as non-malicious.

10. The method as in claim 1, wherein the one or more traffic models classify particular types of data flows as non-malicious based on data flow attributes including one or more of: a source address, a destination address, a source port, a destination port, a uniform resource identifier (URI), a payload field, a flow label field, or an application type.

11. The method as in claim 1, wherein the one or more traffic models are computed according to external requests to classify data flows having a particular attribute as non-malicious.

12. The method as in claim 1, wherein the one or more traffic models are computed by a machine learning traffic modeler.

13. An apparatus, comprising:
   one or more network interfaces to communicate with a network as a traffic model manager node;
   a processor coupled to the one or more network interfaces and configured to execute a process; and
   a memory configured to store program instructions which include the process executable by the processor, the process comprising:
   receiving a data flow in the network;
   determining a degree to which the received data flow conforms to one or more traffic models classifying particular types of data flows as non-malicious;
   when the degree to which the received data flow conforms to the one or more traffic models is above a threshold,
   characterizing the received data flow as non-malicious, and
   white labeling the received data flow that is characterized as non-malicious, wherein white labeled data flows cause the received data flow characterized as non-malicious to bypass a Denial of Service (DoS) attack detector, and wherein the white labeled data flows are not scanned by the DoS attack detector, wherein the DoS attack detector is a device in the network; and when the degree to which the received data flow conforms to the one or more traffic models is below the threshold, forward the received data flow to the DoS attack detector in the network, wherein the DoS attack detector scans the received data flow for potential attacks.

14. The apparatus as in claim 13, wherein the degree to which the received data flow conforms to the one or more traffic models is sufficient when the degree exceeds a predetermined threshold amount.

15. The apparatus as in claim 13, wherein the degree to which the received data flow conforms to the one or more traffic models is sufficient when a source of the received data flows corresponds to a source from which previous data flows have been characterized as non-malicious.

16. The apparatus as in claim 13, wherein whether the degree to which the received data flow conforms to the one or more traffic models is sufficient is dependent on a determination made by a machine learning classifier.

17. The apparatus as in claim 13, wherein the process further comprises:

when a particular data flow is characterized as non-malicious based on the one or more traffic models, characterizing all future occurrences of the particular data flow as non-malicious.

18. The apparatus as in claim 13, wherein the process further comprises:

when a particular data flow is characterized as non-malicious based on the one or more traffic models, characterizing future occurrences of the particular data flow as non-malicious for a predetermined period of time.

19. The apparatus as in claim 13, wherein the process further comprises:

receiving an indication from a machine learning traffic modeler to install the one or more traffic models.

20. The apparatus as in claim 13, wherein the process further comprises:

when characterizing the received data flow as non-malicious, sending a message to a centralized management node indicating that the received data flow has been characterized as non-malicious.

21. The apparatus as in claim 20, wherein the message further indicates other sample data flows that have been characterized as non-malicious.

22. The apparatus as in claim 13, wherein the one or more traffic models classify particular types of data flows as non-malicious based on data flow attributes including one or more of: a source address, a destination address, a source port, a destination port, a uniform resource identifier (URI), a payload field, a flow label field, or an application type.

23. The apparatus as in claim 13, wherein the one or more traffic models are computed according to external requests to classify data flows having a particular attribute as non-malicious.

24. The apparatus as in claim 13, wherein the one or more traffic models are computed by a machine learning traffic modeler.

25. A tangible non-transitory computer readable medium storing program instructions that cause a computer to execute a process, the process comprising:

receiving a data flow at a traffic model manager node in a network;

determining, by the traffic model manager node, a degree to which the received data flow conforms to one or more traffic models classifying particular types of data flows as non-malicious;

when the degree to which the received data flow conforms to the one or more traffic models is above a threshold,
characterizing, by the traffic model manager node, the received data flow as non-malicious and
white labeling the received data flow that is characterized as non-malicious, wherein white labeled data flows cause the received data flow characterized as non-malicious to bypass a Denial of Service (DoS) attack detector, and wherein the white labeled data flows are not scanned by the DoS attack detector, wherein the DoS attack detector is a device in the network; and when the degree to which the received data flow conforms to the one or more traffic models is below the threshold, forwarding, from the traffic model manager node, the received data flow to the DoS attack detector, wherein the DoS attack detector scans the received data flow for potential attacks.

* * * * *